Jan. 13, 1959 L. DREZNER 2,868,602
FURNITURE LEG WITH INSERT
Filed Oct. 18, 1957
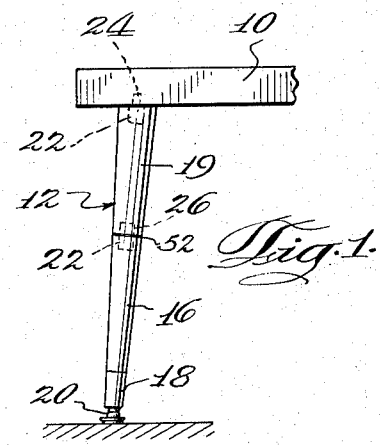
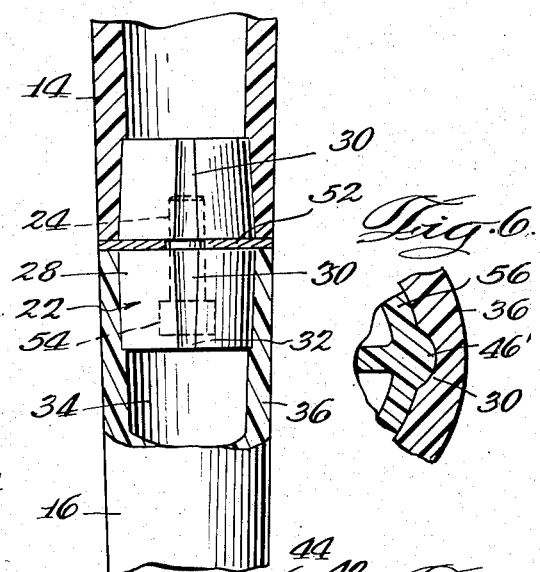
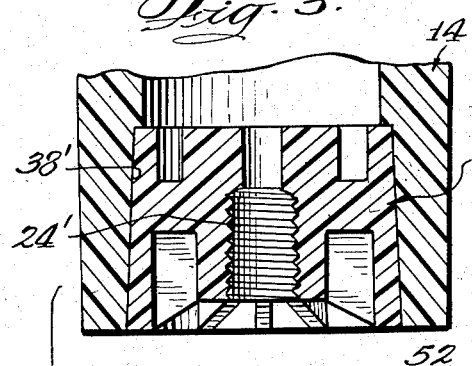
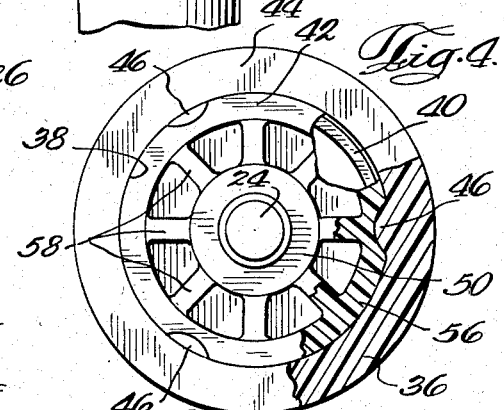
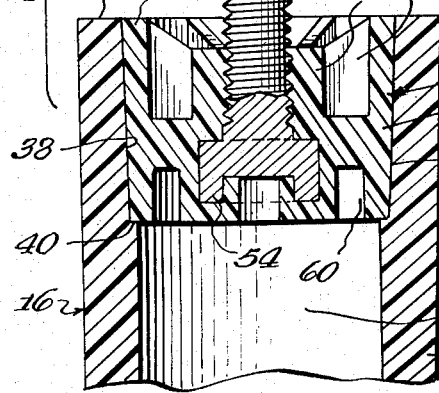
Inventor
Lee Drezner
By Silverman, Mullin, + Cass
Attorneys

United States Patent Office 2,868,602
Patented Jan. 13, 1959

2,868,602

FURNITURE LEG WITH INSERT

Lee Drezner, Lincolnwood, Ill.

Application October 18, 1957, Serial No. 691,035

10 Claims. (Cl. 311—109)

This invention relates generally to furniture and more particularly is concerned with the construction of a furniture leg formed of synthetic resinous material such as high impact strength plastic, and having an insert in an end thereof to enable the leg to be secured to an object.

Hollow furniture legs formed by molding techniques require some manner of insert in order to be able to secure the leg to an article of furniture, and this invention is particularly concerned with providing such a furniture leg in which there is a novel insert, secured within the end of the leg in a novel manner.

The primary object of the invention is to provide a furniture leg as immediately set forth above, which will be extremely economical, easy to assemble, fool-proof, and which will have unusual strength.

Still a further object of the invention is to provide a furniture leg structure in which there are means provided, not only for accurately seating and positioning the insert, but as well for assuring permanent and rigid securing of the insert within the leg.

Another object of the invention lies in the provision of a furniture leg having a novel insert which is of great strength, but is of light weight whereby to require little molding material.

Still a further object of the invention lies in the provision of a furniture leg having an insert therein suitable for use in securing a plurality of leg sections together to form a relatively long leg, the inserts being formed and constructed according to the objects set forth above.

Still a further object of the invention is to provide an insert of the character described which is suitable for use either as means supporting a stud, enabling the furniture leg to be secured to a threaded socket in an object, or as means having a threaded socket therein, whereby an object having a threaded stud may be engaged therewith.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of this invention, there is illustrated in the accompanying drawings a preferred embodiment thereof, from an inspection of which, when considered in connection with the following description, this invention, its mode of construction, assembly and operation, and many of its advantages should be readily understood and appreciated.

Referring to the drawings in which the same characters of reference are employed to indicate corresponding or similar parts throughout the several figures of the drawings:

Fig. 1 is an elevational view illustrating a furniture leg of the type which is constructed according to the invention herein.

Fig. 2 is a sectional view through a joint of the leg of Fig. 1 and illustrating the details of the invention, the inserts being shown in elevation.

Fig. 3 is an exploded sectional view of the joint illustrated in Fig. 2 but on an enlarged scale.

Fig. 4 is an end-on plan view of the bottom portion of the joint of Fig. 3 taken generally through the plane 4—4 and viewed in the direction indicated, and with portions broken away to show details.

Fig. 5 is a bottom plan view of one of the inserts illustrated in Fig. 3.

Fig. 6 is a fragmentary sectional view through a modified form of the invention.

The invention is shown here exemplified in a furniture leg having two sections, there being an insert in one section and at least one, and preferably two inserts in the other section. The invention is not intended to be limited by this illustration and hence is applicable to furniture legs having more than two sections, and as well to single section furniture legs. Practically speaking, a substantial number of applications would utilize a single leg section, and have a single insert for securement of the single leg section to the body of the article of furniture.

Referring now to Fig. 1, there is illustrated a fragment of an article of furniture, for example, a table having a table top or panel 10 having a leg designated generally 12 and formed of an upper section 14 and a lower section 16. The lower section has a metal sleeve or ferrule 18 secured in any suitable manner and carrying a support glider or other foot 20. The invention is in nowise concerned with the construction or arrangement of the ferrule 18 and glider 20.

The upper end of the upper section 14 may have an insert 22 therein of the type to be described as a male type, provided with a protruding stud 24 adapted to be screwed into a suitable socket (not shown) in the bottom surface or other bottom structure of the table top 10. At its lower end the upper section 14 may have an insert 26 of a type to be described as a female type, having a threaded socket therein to receive the stud of another male type insert 22 provided in the upper end of the lower section 16.

Considering now the details of the invention it is first desired to point out that the invention is especially applicable to furniture legs which are molded from synthetic plastic materials, such as resins of high impact strength. Examples would include styrenes, epoxy resins, phenolic condensate resins, and the like. The exact material is of no particular consequence, and depends upon the purposes for which the leg is to be used, economic factors, and the like. The problems which are peculiar to molded materials reside in the difficulties in removing the molded articles from the molds. Many synthetic plastics or resins are fairly flexible when warm, and the mold draft need not be critical to enable removal from the molds. Often dimensions need not be maintained too accurately. Where very dense materials are used, or relatively heavy or thick pieces are used, or where the dimensions must be maintained and shape preserved, very often there is little flexibility. Thus, the draft or taper is important and must be preserved, and it therefore is difficult to produce the type of leg with which this invention is concerned.

Other furniture legs with inserts are known, but the insert has in the past not been securely engaged within the leg, it has not been properly positioned therein, it has not been light and strong.

In this invention, the principal form of the insert of the invention is that designated by the reference character 22, the male type. It is also formed as a molded member of some high impact plastic material, and may have even greater strength than the material from which the leg sections 14 and 16 are molded. The insert 22 is of generally cylindrical form having an exterior cylindrical wall 28 which has a slight uniform taper. The taper renders the bottom end as viewed in Figs. 2 and 3 the smaller. The wall 28 is provided with flutes or grooves 30 extending generally parallel with the axis of the insert 22, but obviously not precisely so. Since the wall 28 is tapered, the grooves 30 if of uniform cross section throughout their length would approach the axis toward their bottom ends as viewed in Fig. 3. They are also tapered, however, becoming smaller toward the bottom ends of the grooves 30 as indicated at 32 in Fig. 2. This is a somewhat exaggerated view since the taper of the grooves is not as pronounced as shown.

The bottom leg section 16 is molded from some high impact plastic, as explained, and its interior is hollow as shown at 34, thereby providing a cylindrical wall 36 of substantially uniform thickness in the vicinity of the upper end thereof. Obviously there is a slight taper to enable removal of the leg section 16 from its mold.

At the upper end of the leg section 16 there is provided a socket 38 the contours of which taper downwardly in an amount so that the insert wall 28 will matingly engage therein in a relatively tight fit. An annular shoulder 40 is formed on the inside wall 36 defining the bottom end of the socket 38 and serving as stop means to prevent the insert 22 from being pushed into the socket 38 any more than the precise distance which will align the transverse annular top rim 42 of the insert 22 with the annular end 44 of the leg section 16. The interior surface of the socket 38 is provided with protruding, generally vertical ridges or ribs 46 of downwardly tapered configuration to matingly engage with the flutes or grooves 30 of the insert 22.

It will be seen from the description thus far made that the insert 22 is constructed to carefully engage within the socket 38 in tight wedging association. This is provided by the taper of the socket 38 and the cylindrical wall 28 as well as the engagement of the flutes or grooves 30 with the ridges 46. The engagement is one which is perfectly located, because if a workman assembling the leg pushes the insert home as far as it goes, it will seat upon the shoulder 40. It is one in which it is impossible for there to be any twisting of the insert 22 relative to the leg section 16 because of the grooves and ridges. Moreover, the wedging engagement provides great adherence of the insert in the socket.

While it is feasible with certain types of materials to have the wedging engagement secured only by the friction itself, forcing the insert into place, it is preferable to cement the insert 22 within the socket 38, using the type of solvent which provides for a substantial weld of the parts.

The insert 22 is formed with a central coaxial solid section 50 into which is molded the threaded stud 24 which in this illustration is in the form of a conventional cap screw having its head 54 located at the bottom end of the central section 50. The central section is connected to the outer coaxial generally cylindrical section 56 by a series of radial ribs 58 providing great strength through the use of very little material. The annular groove 60 on the bottom end of the insert decreases the amount of material needed without reducing the strength of the insert. The ribs 58 meet the central section 50 at the upper end thereof on a transverse plane spaced axially from the top rim 42 so that when the leg section 16 is screwed into an object it may be pulled tightly. Any imperfections in the vicinity of a socket provided in the object or in the end of the insert would otherwise prevent this tight engagement. Furthermore, the molding of the stud into the insert 22 may sometimes fill the threads of the stud immediately adjacent the end of the center section 50 with the molding material.

In securing or mounting a leg or leg section such as 16 to an object, the only requirement is that the object be provided with a threaded socket aligned with the stud 24 and of the same pitch and type of thread. There is no danger in screwing the leg into place because the insert cannot give way unless there is a fracture. Thus, this can be done even if the cement is not fully cured.

In the illustrations it will be seen that the upper section 14 has an insert 26 which in substantially all respects is the same as the insert 22 except that the taper is in the opposite direction and the stud 24 is not molded in place. Instead of the stud there is provided a thread socket 24' which may be formed in the insert after the molding thereof. The leg section 14 likewise has the same type of socket 38' as the socket 38 except that the taper is in the opposite direction. In all other respects the inserts are identical, and hence there is no need to describe the insert 26.

When two sections such as 14 and 16 are coupled together through the use of the inserts of the invention, an annular ring 52 is usually inserted between the sections for ornamental camouflage of the joint and to serve as a pressure washer between sections.

As shown in Fig. 6, the inserts 22 or 26 may have the ribs or ridges formed thereon as indicated at 46' while the flutes may be formed in the surface of the socket 38 or 38' as indicated at 30'.

Since the invention is principally concerned with molded articles, and the problems which are solved are especially acute in such instances, the taper of the parts is of great importance. In order to describe the configurations of the socket 38 and mating insert 22 in the claims appended hereto, use is made of the designation "frusto-conical" which is intended to define the tapered almost cylindrical surfaces 28 and 38.

It is believed that this invention, its mode of construction and assembly, and many of its advantages should be readily understood from the foregoing without further description, and it should also be manifest that while a preferred embodiment of the invention has been shown and described for illustrative purposes, the specific details are nevertheless capable of wide variation within the purview of this invention as defined in the appended claims.

What it is desired to claim by Letters Patent of the United States is:

1. A furniture leg for securing to an object and comprising a hollow molded body having a socket formed therein with a frusto-conical interior surface, a molded insert engaged within the socket and having a frusto-conical exterior surface for coaxially and wedgingly mating with said interior surface, elongate ribs formed on one frusto-conical surface extending generally in the direction of the axis of the said body and insert, and flutes on the second surface for engaging the ribs when the insert is within said socket, and the insert having fastening means centrally thereof to enable securement to said object.

2. A furniture leg as claimed in claim 1 in which the ribs and flutes are tapered to provide a wedging engagement therebetween.

3. A furniture leg as claimed in claim 1 in which the ribs are provided on the insert and the flutes on the socket.

4. A furnture leg as claimed in claim 1 in which the socket has stop means therein to limit the extent of insertion of the insert.

5. A furniture leg as claimed in claim 1 in which the insert is formed of a central cylindrical portion and an outer coaxial generally cylindrical portion connected by radial ribs and said fastening means is in said central cylindrical portion.

6. A furniture leg as claimed in claim 1 in which the insert is formed of a central cylindrical portion and an outer coaxial generally cylindrical portion connected by radial ribs and said fastening means is in said central cylindrical portion, and comprises a threaded metal stud coaxially molded into said central cylindrical portion and extending out of the insert.

7. A furniture leg as claimed in claim 1 in which the insert is formed of a central cylindrical portion and an outer coaxial generally cylindrical portion connected by radial ribs and said fastening means is in said central cylindrical portion and comprises a threaded socket.

8. A furniture leg for securement to an object and the object having a threaded opening to receive a threaded stud provided in said furniture leg, and said furniture leg comprising a hollow molded body member having a frusto-conical socket formed in the upper end thereof with the larger diameter portion upward, a molded insert of substantially the same frusto-conical configuration wedgingly engaging within said socket, said socket and insert having mating engaging vertical rib means and grooves reeciving the same, a shoulder formed in the socket at the bottom thereof to provide transverse alignment between the upper ends of insert and hollow body when same are engaged, and a threaded stud molded into the said insert.

9. A furniture leg as claimed in claim 8 in which the rib means and grooves are tapered with the narrower ends downward to provide wedging engagement therebetween, while preventing axial movement of the insert relative to the said body.

10. A furniture leg for securement to an object and comprising a leg section having a transverse upper end and a hollow frusto-conical socket formed therein with the larger diameter end of the socket opening at said upper end and forming thereby an annular rim, a molded insert having its surface of frusto-conical configuration substantially conforming with that of said socket whereby to enable wedging engagement of the insert in the socket, the insert having a central coaxial portion provided with an end axially spaced inwardly of the larger end of the said insert and thereby providing an annular end rim on said insert, the insert having fastening means in said central coaxial portion, and the lower ends of the socket and insert having stop means cooperating to limit the amount of insertion of the insert whereby to provide a predetermined degree of alignment of said annular rims, and said socket and insert have means to prevent relative movement of the insert as the leg section is twisted in screwing said stud into said object, such means comprising vertical ribs and flutes on respective vertical surfaces of said insert and socket and cooperating in engagement with each other.

References Cited in the file of this patent

UNITED STATES PATENTS

| | | |
|---|---|---|
| 270,661 | Hall | Jan. 16, 1883 |
| 271,143 | Smith | Jan. 23, 1883 |
| 316,286 | McLain | Apr. 21, 1885 |
| 344,392 | McLain | June 29, 1896 |
| 719,146 | Schofield | Jan. 27, 1908 |
| 908,487 | Nail | Jan. 5, 1909 |
| 1,638,561 | Busch et al. | Aug. 9, 1927 |
| 1,743,888 | Hamister | Jan. 14, 1930 |
| 2,045,520 | Davison | June 23, 1936 |
| 2,214,177 | Raybould | Sept. 10, 1940 |